(12) United States Patent
Gilbert et al.

(10) Patent No.: US 10,693,346 B1
(45) Date of Patent: Jun. 23, 2020

(54) APPARATUS SUPPLYING ALTERNATING CURRENT FOR A LOAD

(71) Applicants: Nicholas Gilbert, Berea, KY (US); Michael Leger, Berea, KY (US)

(72) Inventors: Nicholas Gilbert, Berea, KY (US); Michael Leger, Berea, KY (US)

( * ) Notice: Subject to any disclaimer, the term of this patent is extended or adjusted under 35 U.S.C. 154(b) by 0 days.

(21) Appl. No.: 16/255,916

(22) Filed: Jan. 24, 2019

(51) Int. Cl.
| H02K 7/18 | (2006.01) |
| H02K 7/00 | (2006.01) |
| H02K 7/116 | (2006.01) |
| F03G 1/02 | (2006.01) |
| H02K 11/04 | (2016.01) |
| H02K 11/00 | (2016.01) |
| F03G 1/08 | (2006.01) |
| H02K 11/33 | (2016.01) |
| H02J 7/14 | (2006.01) |

(52) U.S. Cl.
CPC .............. H02K 7/1853 (2013.01); F03G 1/02 (2013.01); F03G 1/08 (2013.01); H02J 7/1415 (2013.01); H02J 7/1423 (2013.01); H02K 7/003 (2013.01); H02K 7/116 (2013.01); H02K 11/0094 (2013.01); H02K 11/04 (2013.01); H02K 11/33 (2016.01)

(58) Field of Classification Search
CPC ............ H02K 7/1853; F03G 1/02; F03G 1/08
USPC .......................................... 290/1 A, 1 E, 1 R
See application file for complete search history.

(56) References Cited

U.S. PATENT DOCUMENTS

| 3,732,949 A * | 5/1973 | Williams ................. F03G 1/00 185/40 R |
| 3,800,212 A * | 3/1974 | Branco .................. G04C 10/00 322/28 |
| 4,020,923 A * | 5/1977 | Taylor ...................... F03G 1/00 185/11 |
| 4,228,360 A * | 10/1980 | Navarro ............. F03B 13/1885 290/43 |
| 4,287,428 A | 9/1981 | Smith |
| 4,799,003 A * | 1/1989 | Tu ......................... G04C 10/00 290/1 E |
| 5,917,310 A | 6/1999 | Baylis |
| 6,034,492 A | 3/2000 | Saito et al. |
| 6,291,900 B1 | 9/2001 | Tiemann et al. |
| 6,462,444 B1 | 10/2002 | Makkum |
| 6,523,646 B1 | 2/2003 | Gates |
| 6,747,246 B2 | 6/2004 | Crandell, III |
| 6,825,574 B1 * | 11/2004 | Mooring ................... F03D 1/00 290/1 R |
| 7,009,350 B1 | 3/2006 | Gold |
| 7,151,322 B2 | 12/2006 | Eskndr |
| 7,205,732 B1 * | 4/2007 | Gold ........................ H02P 9/48 290/1 A |
| 7,504,737 B2 | 3/2009 | Vasilovich et al. |
| 7,834,471 B2 | 11/2010 | Cripps |
| 8,148,832 B2 * | 4/2012 | Cripps ..................... F03G 1/02 290/1 E |
| 2002/0167174 A1 * | 11/2002 | Haass ..................... F02B 63/04 290/1 A |
| 2003/0042807 A1 * | 3/2003 | Blake ..................... H02K 53/00 310/66 |
| 2006/0163876 A1 | 7/2006 | Eskndr |

* cited by examiner

Primary Examiner — Pedro J Cuevas
(74) Attorney, Agent, or Firm — Business Patent Law, PLLC; Kenneth F. Pearce (57) ABSTRACT

An apparatus supplying alternating current to a load.

15 Claims, 8 Drawing Sheets

APPARATUS SUPPLYING ALTERNATING CURRENT FOR A LOAD

FIELD OF THE INVENTION

Among other things, the current invention is an apparatus supplying alternating current (AC) for a load. More specifically, the portable apparatus supplying AC can be particularly useful in absence of or disruption of commercially available AC transported via the publically regulated power grid.

SUMMARY OF THE INVENTION

Unlike prior art, preferred embodiments of the current invention are easily moved from a first place to a second place. Preferred embodiments of the present invention can be carried by mechanical carriers provided with rollers or wheels while other preferred embodiments of the current invention of can be of a size and weight that allow the apparatus to be carried by a user of the apparatus. It has been discovered that the present invention can power loads, such as, air conditioners, computers, electric cooking devices, electric heaters, radios, rechargers for mobile direct current (DC) powered devices, televisions and the like.

A preferred embodiment of the present invention can be described as an apparatus, carried by a portable carrier, supplying alternating current (AC) to a load; the apparatus comprising: a) a first shaft connected to a first gear combination; b) a spring adapted for storing and delivering mechanical energy to the first shaft that rotates the first gear combination to energize an alternator, thereby generating AC that subsequently flows to: i) a semiconductor converting AC to direct current (DC); and/or ii) an AC motor adapted to energize a second gear combination; c) the second gear combination connected to the spring; d) one or more batteries connected with the semiconductor; e) an inverter connected with: i) the one or more batteries; ii) an AC outlet supplying AC when the load is drawn from the AC outlet; and/or iii) the AC motor; f) a stop contacting the second gear combination preventing the spring from unwinding until rotation of the shaft is initiated; and g) a control module connected to the semiconductor regulating DC supplied to the one or more batteries and controlling AC flow to the AC motor, wherein the control module further: i) according to predetermined parameters, activates the AC motor to energize the second gear combination that torques the spring; and/or ii) measures voltage stored in the one or more batteries, and according to predetermined parameters, actuates the AC motor to energize the second gear combination; and/or iii) signals that supplemental energy is required to replenish the one or more batteries; and/or iv) according to preselected parameters, supplies supplemental energy from a source distinct from the apparatus to the one or more batteries or the AC motor, wherein the supplemental energy source supplies supplemental energy through an AC inlet, DC inlet, an electromechanical or a manual crank.

Another preferred embodiment of the present invention can be described as an apparatus, carried by a portable carrier, supplying alternating current to a load; the apparatus comprising: a) one or more batteries; b) a first shaft connected to a first gear combination; c) a spring adapted to store and subsequently deliver mechanical energy to the first shaft that energizes the first gear combination to energize an alternator generating AC; d) an AC motor adapted to energize a second gear combination winding the spring; e) a stop connected with the second gear combination preventing the spring from unwinding until rotation of the shaft is initiated; f) an AC outlet, an AC inlet or a DC inlet and a mechanical connection for the application of mechanical energy; and g) a controller comprising a processor, a memory, an AC to DC conversion module, an inverter module and a voltage sensor module, wherein the controller simultaneously controls, in accordance with first and second predetermined voltage levels, AC and DC flows associated with the AC outlet, the AC inlet and the DC inlet.

Still another preferred embodiment of the present invention can be described as an apparatus supplying alternating current to a load; the apparatus comprising: a) a size and weight adapted to be carried by a user of the apparatus; b) a battery; c) a first shaft connected to a first gear combination; d) a spring adapted to store and subsequently deliver mechanical energy to the first shaft rotating the first gear combination to energize an alternator generating AC; e) an AC motor energizing a second gear combination winding the spring; f) a stop connected with the second gear combination preventing the spring from unwinding until rotation of the shaft is initiated; and g) a control module connected to the semiconductor regulating voltage supplied to the battery and controlling AC flow to the AC motor and the AC outlet, wherein the controller module further: i) measures voltage stored in the battery and according to predetermined parameters, activates the AC motor to energize the second gear combination winding the spring; and/or ii) signals that supplemental energy is required to replenish the battery.

It is the novel and unique interaction of these simple elements which creates the apparatus, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

The disclosure hereof is detailed to enable those skilled in the art to practice the invention, and the embodiments published herein merely exemplify the present device and do not limit the scope of any claims appended hereto.

The present invention is particularly useful when there is an absence of or temporary disruption of commercially available alternating current (AC) transported via the publicly regulated power grid. Portability of select preferred embodiments of the current invention allows the user to conveniently move the apparatus from a first place to a second place. Some select preferred embodiments of the current invention of are of a size and weight that allow the apparatus to be carried by a user of the apparatus. And other select preferred embodiments of the present invention are carried by mechanical carriers provided with rollers or wheels.

The current apparatus supplies AC to for the operation of a load. It has been discovered that the present invention can power loads, such as, air conditioners, computers, electric cooking devices, electric heaters, radios, rechargers for mobile direct current (DC) powered devices and televisions.

Figure 1:
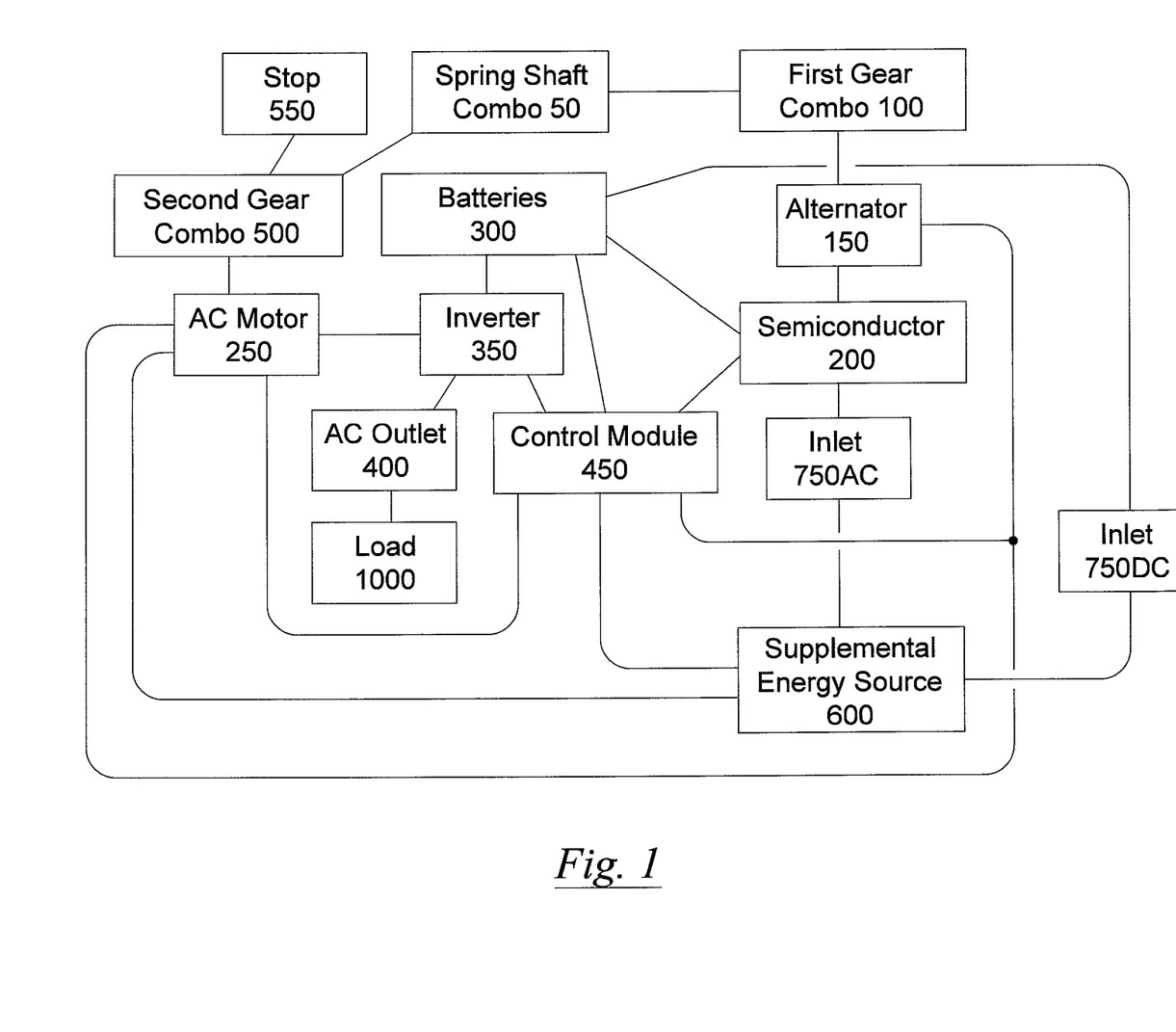
FIG. 1 is a diagrammatic representation of a preferred embodiment of the current apparatus for supplying AC.

FIG. 1 is a diagrammatic representation of a preferred embodiment of the current apparatus for supplying AC.

Spring and shaft combination (50) is adapted for storing and delivering mechanical energy. The spring is connected to a first shaft that is connected to a first gear combination (100). Spring and shaft combination (50) supplies mechanical energy to first gear combination (100). First gear combination (100) increases rotational speed of alternator (150). It has been discovered that preferred first gear combinations (100) can include from three to 12 intermeshed gears to step up rotational speed of alternator (150) when compared to the use of a single gear to rotate alternator (150). In select preferred embodiments, the shaft connected to the first gear combination (100) can rotate at speeds of from about 1 RPM to about 50 RPM. In a preferred embodiment of the current invention, alternator (150) can reach speeds of from about 50 RPM to about 1200 RPM.

Alternator (150) is connected to semiconductor (200) and AC motor (250). AC motor (250) is connected to second gear combination (500). Second gear combination (500) provides a means of winding the spring of spring and shaft combination (50). Stop (550) is connected to second gear combination (500) to prevent the spring from unwinding until rotation of the shaft is required.

In this preferred embodiment, alternator (150) can supply AC to AC motor (250) and/or semiconductor (200). Semiconductor (200) converts AC to DC that is stored in one or more batteries (300). Through experimentation, for this preferred embodiment, it was discovered that LiFePO$_4$ batteries provide better durability than other batteries and that at least two LiFePO$_4$ batteries in the battery bank provided better usability than a single battery. It was also discovered that two LiFePO$_4$ batteries (300) can provide from about 1100 ampere hours to about 1200 ampere hours of energy before supplemental energy is required to replenish the batteries (300).

Among other things, one or more batteries (300) are connected to inverter (350). Inverter (350) is also connected to AC motor (250) and AC outlet (400). When load (1000) draws current from AC outlet (400), inverter (350) supplies AC to AC outlet (400). Select preferred embodiments of current invention are provided with more than a single AC outlet (400) connected to inverter (350).

Control module (450) is connected to alternator (150), semiconductor (200), AC motor (250), one or more batteries (300) and can be connected to supplemental energy source (600). When control module (450) senses that the voltage stored in the one or more batteries (300) has dropped to a first predetermined level, control module (450) causes alternator (150) and/or inverter (350) to supply AC to activate AC motor (250). Through experimentation is has been discovered when voltage of the one or more batteries drops below first a predetermined level of from about 13.5 volts to about 12 volts, control module (450) causes alternator (150) and/or inverter (350) to supply AC to AC motor (250) to activate AC motor (250).

AC motor (250) is connected to second gear combination (500) that winds the spring of spring and shaft combination (50). Preferred embodiments of second gear combination (500) can include up to three or more intermeshed gears. In some embodiments, first and second gear combinations (100, 500) can be interconnected by chain links. It has been discovered that 0.4 volts drawn from one or more batteries (300) by AC motor (250) can wind the spring to enable the spring to rotate the shaft of the spring and shaft combination (50).

Supplemental energy (600) sources can include one or more of the following: the publicly regulated power grid, manual, solar energy converter or wind energy converter. When control module (450) senses that voltage has dropped to a second predetermined level below 11.9 volts and that without the addition of supplemental energy, the present invention is incapable of supplying AC to load (1000), control module (450) can signal, audibly, visually or both, that supplemental energy is required. In select preferred embodiments, control module (450) can automatically supply supplemental energy from the publicly regulated power grid, solar energy converter or wind energy converter to one or batteries (300).

When the publicly regulated power grid, solar energy converter or wind energy converter supplemental sources of energy are unavailable to replenish voltage to the one or more batteries (300), a hand crank (950 shown in FIGS. 4-8) can be used to rotate the first gear combination (100) or the second gear combination (500). Manual activation of second gear combination (500) winds the spring that rotates the shaft of the spring and shaft combination (50). Rotation of the shaft of the spring and shaft combination (50) energizes the first gear combination (100) that energizes alternator (150) and sends AC to AC motor (250) and/or to semiconductor (200) that subsequently replenishes DC stored in the one or more batteries (300). In a similar vein, manual activation of the first gear combination (100) causes the alternator (150) to supply AC to AC motor (250) to power the second gear combination (500) to wind the spring of the spring and shaft combination used to activate first gear combination (100). Preferred embodiments of the current apparatus can also be provided with one or more inlets (750AC, 750DC) for receiving AC or DC to replenish voltage stored in the one or more batteries (300).

Figure 2:
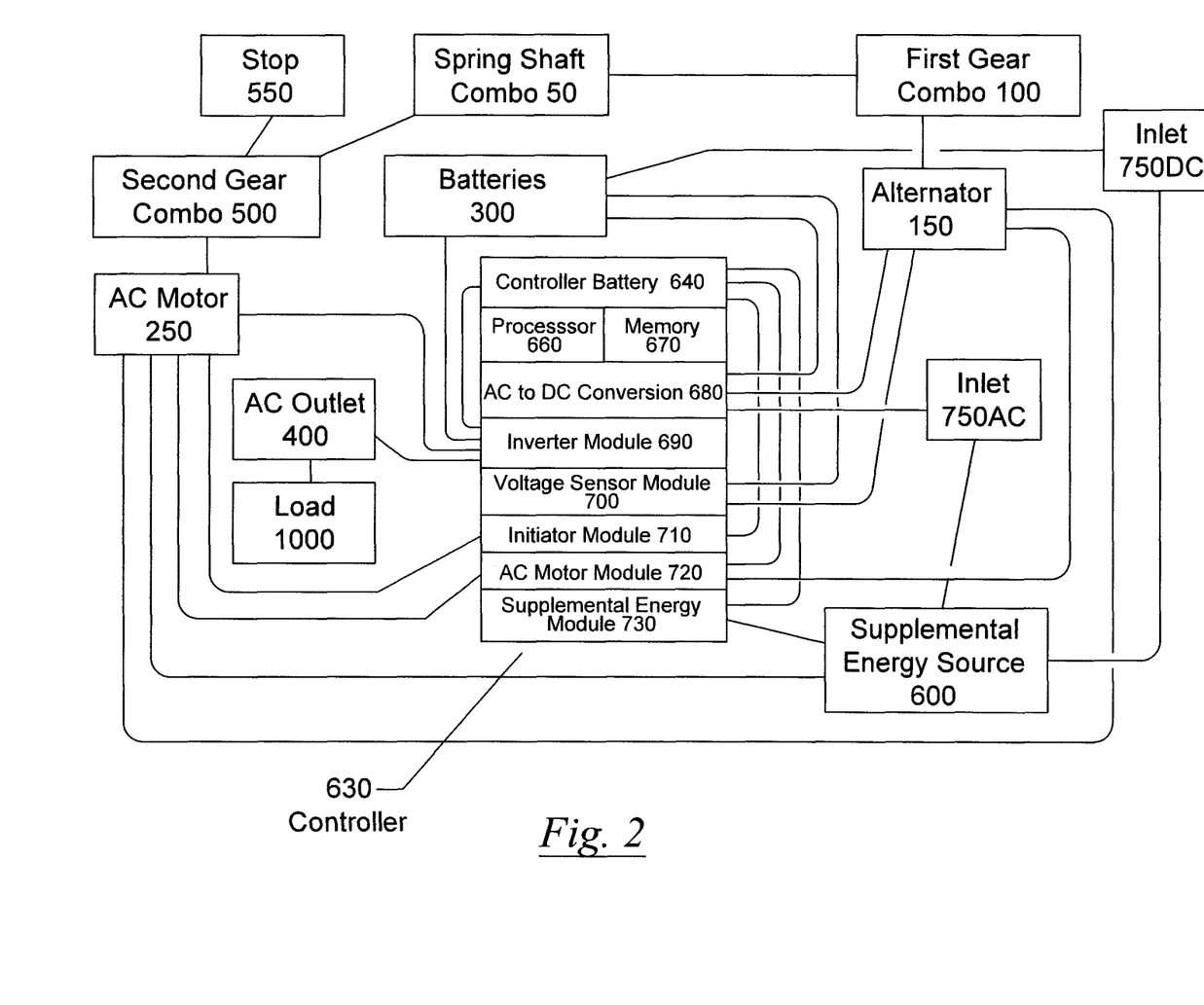
FIG. 2 is a diagrammatic representation of a preferred embodiment of the current apparatus for supplying AC.

FIG. 2 is a diagrammatic representation of another preferred embodiment of the current apparatus for supplying AC.

Spring and shaft combination (50) is adapted for storing and delivering mechanical energy. The spring is connected to a first shaft that is connected to a first gear combination (100). Spring and shaft combination (50) supplies mechanical energy to first gear combination (100). First gear combination (100) is provided to increase rotational speed of alternator (150). It has been discovered that preferred first gear combinations (100) can include from three to 12 intermeshed gears to step up rotational speed of alternator (150) when compared to the use of a single gear to rotate alternator (150). In select preferred embodiments, the shaft connected to the first gear combination (100) can rotate at speeds of from about 1 RPM to about 50 RPM. In a preferred embodiment of the current invention, alternator (150) can reach speeds of from about 50 RPM to about 1200 plus RPM.

Alternator (150) is connected to controller (630) and AC motor (250). AC motor (250) is connected to second gear combination (500). Second gear combination (500) provides a means of winding the spring of spring and shaft combination (50). Stop (550) is connected to second gear combination (500) to prevent the spring from unwinding until rotation of the shaft is required. Within the scope of the current invention, some embodiments of first and second gear combinations (100, 500) can be interconnected by chain links.

Controller (630) can be provided with one or more of the following: controller battery (640), processor (660), memory (670), AC to DC conversion module (680), inverter module (690), voltage sensor module (700), initiator module (710), AC motor module (720) and/or supplemental energy module (730).

Via any means acceptable in the art, the controller's (630) controller battery (640), processor (660) and memory (670) intercommunicate with AC to DC conversion module (680), inverter module (690), voltage sensor module (700); initiator module (710), AC motor module (720) and supplemental energy module (730). Interconnection of the present invention's components includes any necessary circuitry. By way of illustration, the current invention is provided with any necessary circuits to interconnect the processor (660), memory (670) and the AC to DC conversion module (680) with the alternator (150) and the one or more batteries (300).

As shown in FIG. 2, alternator (150) can supply AC to AC motor (250) and/or AC to DC conversion module (680). AC to DC conversion module (680) converts AC to DC stored in one or more batteries (300). Through experimentation, for this preferred embodiment, it was discovered that LiFePO$_4$ batteries provide better durability than other batteries and that at least two LiFePO$_4$ batteries in the battery bank provided better usability than a single battery. It was also discovered that two LiFePO$_4$ batteries (300) can provide from about 1100 ampere hours to about 1200 ampere hours of energy before supplemental energy is required to replenish the batteries (300).

One or more batteries (300) are connected to inverter module (690). Inverter module (690) is also connected to alternator (150), AC motor (250) and AC outlet (400). When load (1000) draws current from AC outlet (400), inverter module (690) supplies AC to AC outlet (400). Select preferred embodiments of the current invention are provided with more than a single AC outlet (400) connected to inverter module (690).

Among other things, voltage sensor module (700) is connected to one or more batteries (300). When voltage sensor module (700) senses that voltage stored in the one or more batteries (300) has dropped to a first predetermined level, initiator module (710) causes AC motor (250) to energize second gear combination (500) that rotates the shaft of the spring and shaft combination (50). Rotation of the shaft of the spring and shaft combination (50) energizes the first gear combination (100) that rotates alternator (150) generating AC. Initiator module (710) can be programmed to send the generated AC to AC motor (250) and/or inverter module (690) for replenishing DC stored in one or more batteries (300). Through experimentation it has been discovered when voltage of the one or more batteries (300) drops below a first predetermined level of from about 13.5 to about 12 volts, initiator module (710) is activated.

Preferred embodiments of second gear combination (500) can include up to three intermeshed gears. It has been discovered that 0.4 volts drawn from one or more batteries (300) by AC motor (250) can wind the spring to enable the spring to rotate the shaft of the spring and shaft combination (50).

Voltage sensor module (700) also detects when voltage of controller battery (640) falls below a predetermined voltage. Thereafter, initiator module (710) transfers DC from at least one battery (300) to controller battery (640) restoring controller battery's (640) voltage to an operating voltage.

In select preferred embodiments of the present invention, AC motor module (720) can be provided. Communication between voltage sensor module (700) and AC motor module (720) optimizes AC motor's (250) AC draw from alternator (150) and/or inverter module (690), where, when alternator (150) is operating, AC motor module (720) can be programmed to cause AC motor (250) to first draw from AC alternator (150) before drawing AC from inverter module (690).

Supplemental energy (600) sources can include one or more of the following: the publicly regulated power grid, manual, solar energy DC converter or wind energy DC converter. When voltage sensor module (700) senses that voltage has dropped to a second predetermined level of 11.9 volts and that without the addition of supplement energy, the present invention is incapable of supplying AC to load (1000), supplemental energy module (730) can signal, audibly, visually or both, that supplemental energy is required. Supplemental energy module (730) can be programed to automatically transfer supplemental energy from the publically regulated power grid, solar energy DC converter or wind energy DC converter to one or more batteries (300). Via inlet (750AC), supplemental publically regulated power grid energy can be connected with AC to DC conversion module (680) to replenish one or more batteries (300). Via inlet (750DC), solar energy DC or wind energy DC can be connected to one or more batteries (300).

When the publicly regulated power grid, solar energy converter or wind energy converter supplemental sources of energy are unavailable to replenish voltage to the one or more batteries (300), a hand crank (950 shown in FIGS. 4-8) can be used to rotate the first gear combination (100) or the second gear combination (500). Manual activation of second gear combination (500) winds the spring that rotates the shaft of the spring and shaft combination (50). Rotation of the shaft of the spring and shaft combination (50) energizes the first gear combination (100) that energizes alternator (150) and sends AC to AC motor (250) and/or to controller (630) that subsequently replenishes DC in the one or more batteries (300). In a similar vein, manual activation of the first gear combination (100) causes the alternator (150) to supply AC to AC motor (250) that powers the second gear combination (500) to wind the spring of the spring and shaft combination (50) activating the first gear combination (100).

Figure 3:
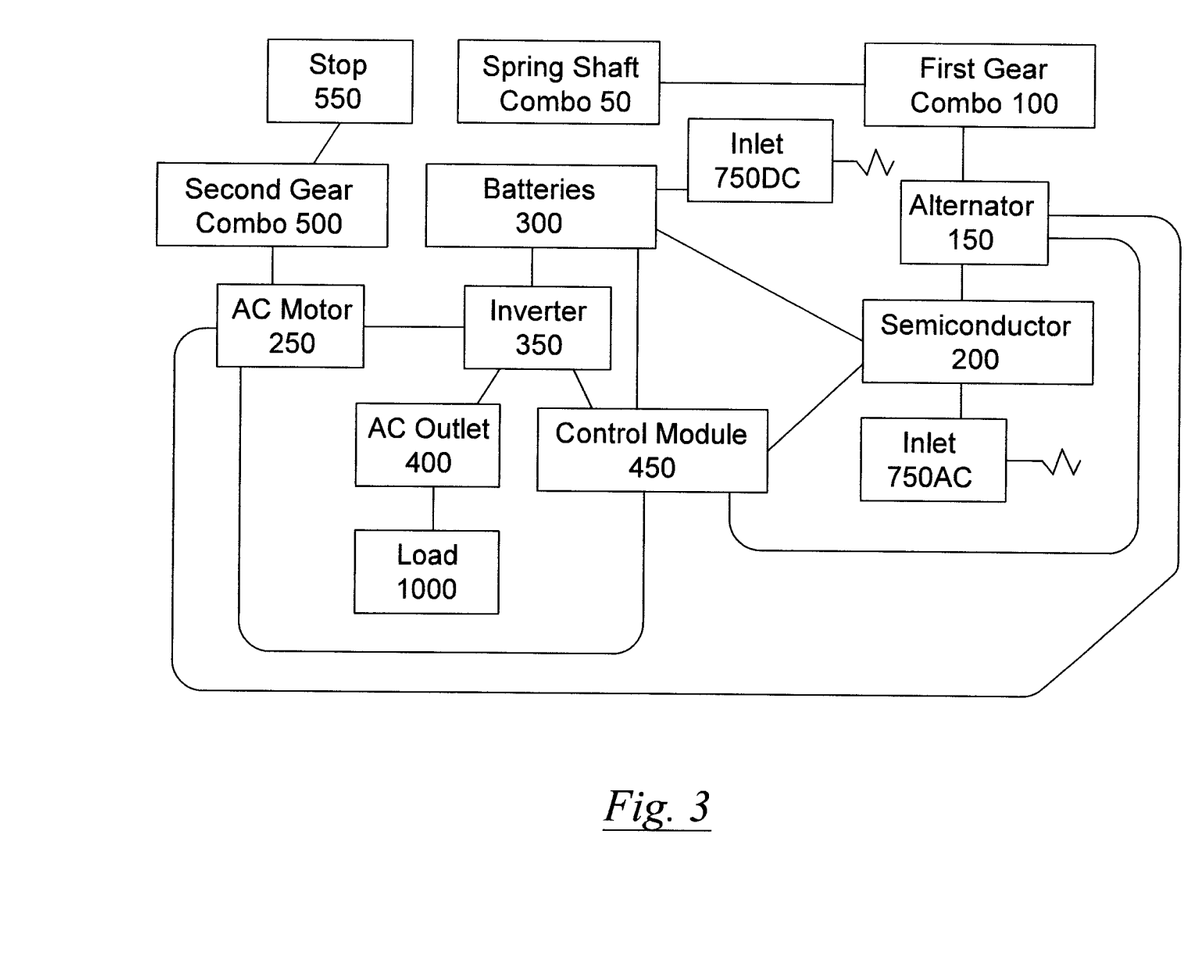
FIG. 3 is a diagrammatic representation of a preferred embodiment of the current apparatus for supplying AC.

FIG. 3 is a diagrammatic representation of another preferred embodiment of the current apparatus for supplying AC.

Spring and shaft combination (50) is adapted for storing and delivering mechanical energy. The spring is connected to a first shaft that is connected to a first gear combination (100). Spring and shaft combination (50) supplies mechanical energy to first gear combination (100). First gear combination (100) is connected to alternator (150) and provided to increase rotational speed of alternator (150). It has been discovered that preferred first gear combinations (100) can include up to three or more intermeshed gears to step up rotational speed of alternator (150) when compared to the use of a single gear to rotate alternator (150). However, because this preferred embodiment can be carried by the user, one or two gears (100) can supply adequate energy to make this preferred embodiment functional. In select preferred embodiments, the shaft connected to the first gear combination (100) can rotate at speeds of from about 1 RPM to about 50 RPM. In select preferred embodiments of the current invention, alternator (150) can reach speeds of from about 50 RPM to about 1200 plus RPM.

Alternator (150) is connected to semiconductor (200) and AC motor (250). AC motor (250) is connected to second gear combination (500). Second gear combination (500) provides a means of winding the spring of spring and shaft combination (50). Stop (550) is connected to second gear combination (500) to prevent the spring from unwinding until rotation of the shaft is required.

In this preferred embodiment, alternator (150) can supply AC to AC motor (250) and/or semiconductor (200). Semiconductor (200) converts AC to DC that is stored in at least one battery (300). Through experimentation, for this preferred embodiment, it was discovered that LiFePO₄ batteries provide better durability than other batteries. At least a single battery (300) is incorporated into this preferred embodiment of the apparatus that can be carried by the user.

Among other things, battery (300) is connected to inverter (350). Inverter (350) is also connected to AC motor (250) and AC outlet (400). When load (1000) draws current from AC outlet (400), inverter (350) supplies AC to AC outlet (400). Select preferred embodiments are provided with more than a single AC outlet (400) connected to inverter (350).

Control module (450), powered by DC from the at least one battery (300), is connected to alternator (150), semiconductor (200), AC motor (250) and battery (300). When control module (450) senses that the voltage stored in battery (300) has dropped to a first predetermined level, control module (450) causes alternator (150) and/or inverter (350) to supply AC to activate AC motor (250). Through experimentation is has been discovered when voltage of the battery drops below first a predetermined level of from about 13.5 volts to about 12 volts, control module (450) causes alternator (150) and/or inverter (350) to supply AC to AC motor (250) to activate AC motor (250). AC motor (250) is connected to second gear combination (500) that winds the spring of spring and shaft combination (50). Preferred embodiments of second gear combination (500) can include up to three or more intermeshed gears. It has been discovered that 0.4 volts drawn from battery (300) by AC motor (250) can wind the spring.

When control module (450) senses that voltage in battery (300) has dropped to a second predetermined level, control module (450) signals, audibly, visually or both, that supplemental voltage is required to replenish battery (300). This preferred embodiment of the apparatus is provided with a hand crank (950 shown in FIGS. 4-8) for cranking either first gear combination (100) or second gear combination (500) to wind the spring of the spring and shaft combination (50). However, the current apparatus can also be provided with one or more inlets (750AC, 750DC) for receiving AC or DC to supplement battery (300). Within the scope of the present invention, supplemental energy sources can be the publicly regulated power grid, solar energy converter or wind energy converter.

Figure 4:
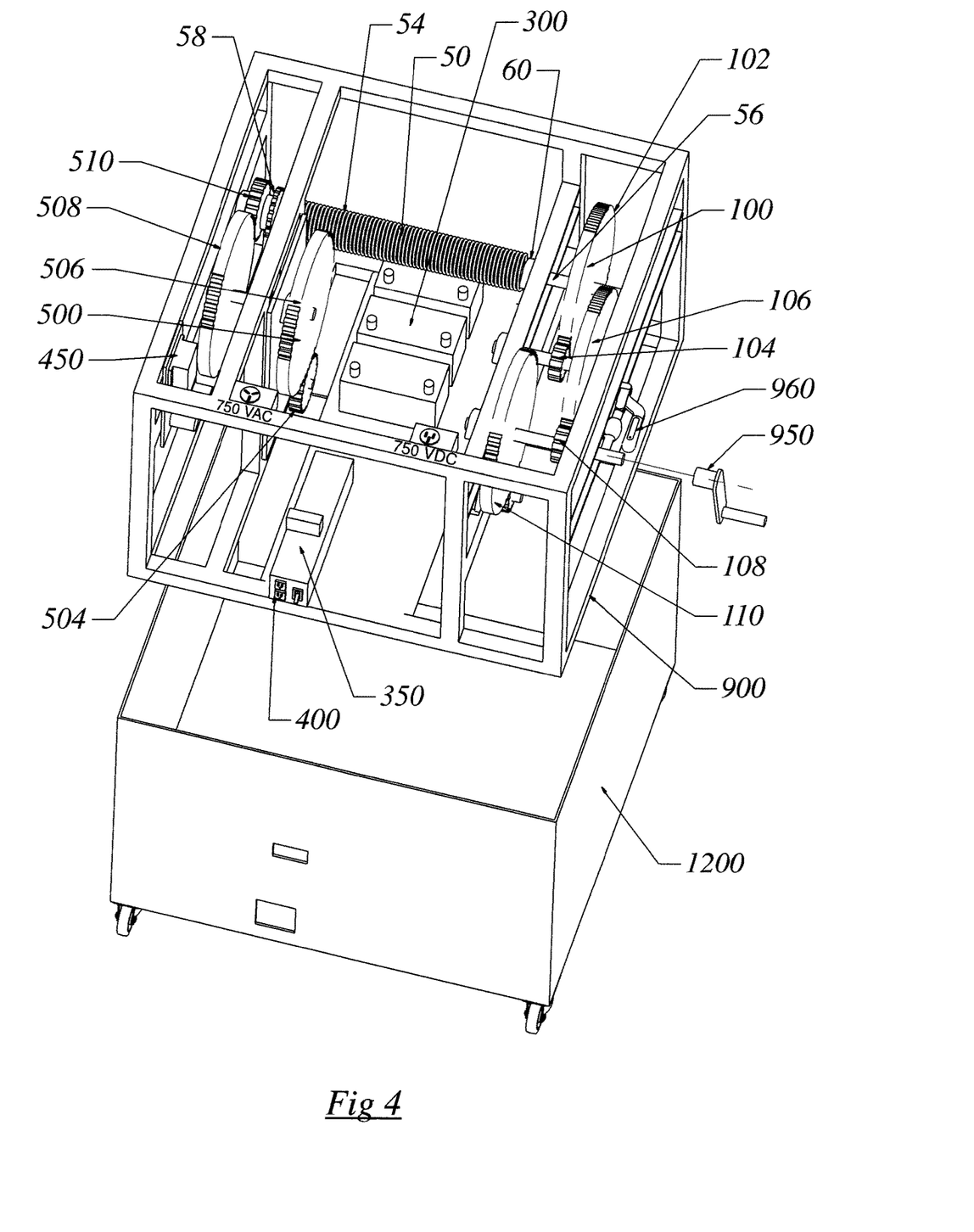
FIG. 4 is an exploded perspective of a first preferred embodiment of the current apparatus, where select elements of the invention are shown above the carrier.
Figure 5:
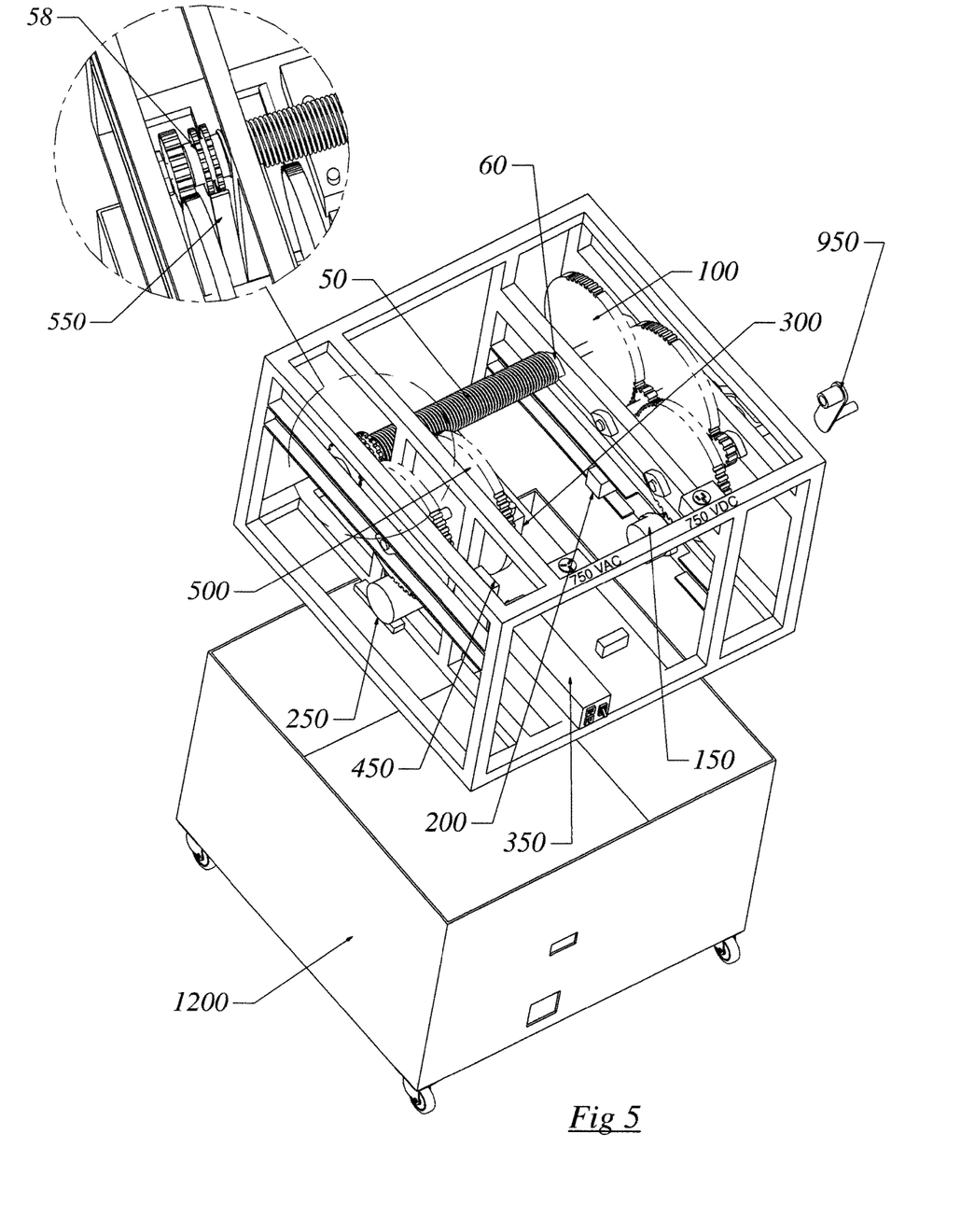
FIG. 5 is an exploded perspective of a first preferred embodiment of the current apparatus, where select elements of the invention are shown above the carrier.

FIGS. 4 and 5 are exploded perspectives of a first embodiment of the current apparatus, where select elements of the invention are attached to frame (900) above portable carrier (1200). In operation, frame (900) can be carried by portable carrier (1200). For ease of understanding, select mechanical structures of the invention are shown without the connections that transmit electricity. By way of illustration, among other things, those skilled in the art recognize that connections between the one or more batteries (300) and inverter (350) are required for current invention's operation. Within the scope of the current invention, interconnections and communications between the elements of the current invention are enabled in FIGS. 1-3.

With reference to FIGS. 4 and 5, spring and shaft combination (50) is connected to first gear combination (100). Torsion spring (54) rides on shaft (56). As shown mechanical stop (550) engages second gear combination (500) and prevents spring (54) from unwinding until it is necessary to rotate shaft (56). Unwinding spring (54) causes shaft (56) to rotate first gear combination (100). Second gear combination (500) is attached to a first slidable collar (58) of spring (54) riding on shaft (56). When activated, second fixed collar (60) attached to shaft (56) rotates shaft (56) connected with first gear combination (100). When approximately 800 Joules of torque is applied to spring (54), spring (54) rotates shaft (56).

As shown, first gear combination (100) utilizes intermeshed gears (102-110) to rotate alternator's (150) rotor. However, other preferred embodiments of the invention can use more or less intermeshed gears to rotate the alternator's (150) rotor. Although not shown, other embodiments of the current invention can be provided with chain links or other means linking the gears instead of intermeshed gears allowing first gear combination (100) to rotate alternator's (150) rotor.

As shown, second gear combination (500) utilizes intermeshed gears (504-510) to wind spring (54) However, other preferred embodiments of the invention can use more or less intermeshed gears to wind spring (54). Although not shown, other embodiments of the current invention can be provided with chain links or other means linking the gears instead of intermeshed gears allowing second gear combination (500) to wind spring (54).

In any manner acceptable in the art:
  alternator (150) is connected to semiconductor (200);
  semiconductor (200) is connected to one or more batteries (300);
  one or more batteries (300) are connected to inverter (350);
  inverter (350) is connected to AC outlet (400) and AC motor (250);
  AC motor (250) is connected to alternator (150) and second gear combination (500); and
  control module (450) is connected with alternator (150), semiconductor (200), AC motor (250), one or more batteries (300), inverter (350) and supplemental energy source (600) (not shown in FIGS. 4-5).

Inlets (750 AC and 750 DC) are positioned on frame (900). Supplemental energy source (600) can be connected to inlets (750 AC or 750 DC) in any manner acceptable in the art. Select preferred embodiments of the current invention are provided with a circuit breaker that can prevent transmission of electricity through the invention's circuits. Select preferred embodiments can be provided with a lock that prevents the mechanical components of the invention from operating.

Figure 6:
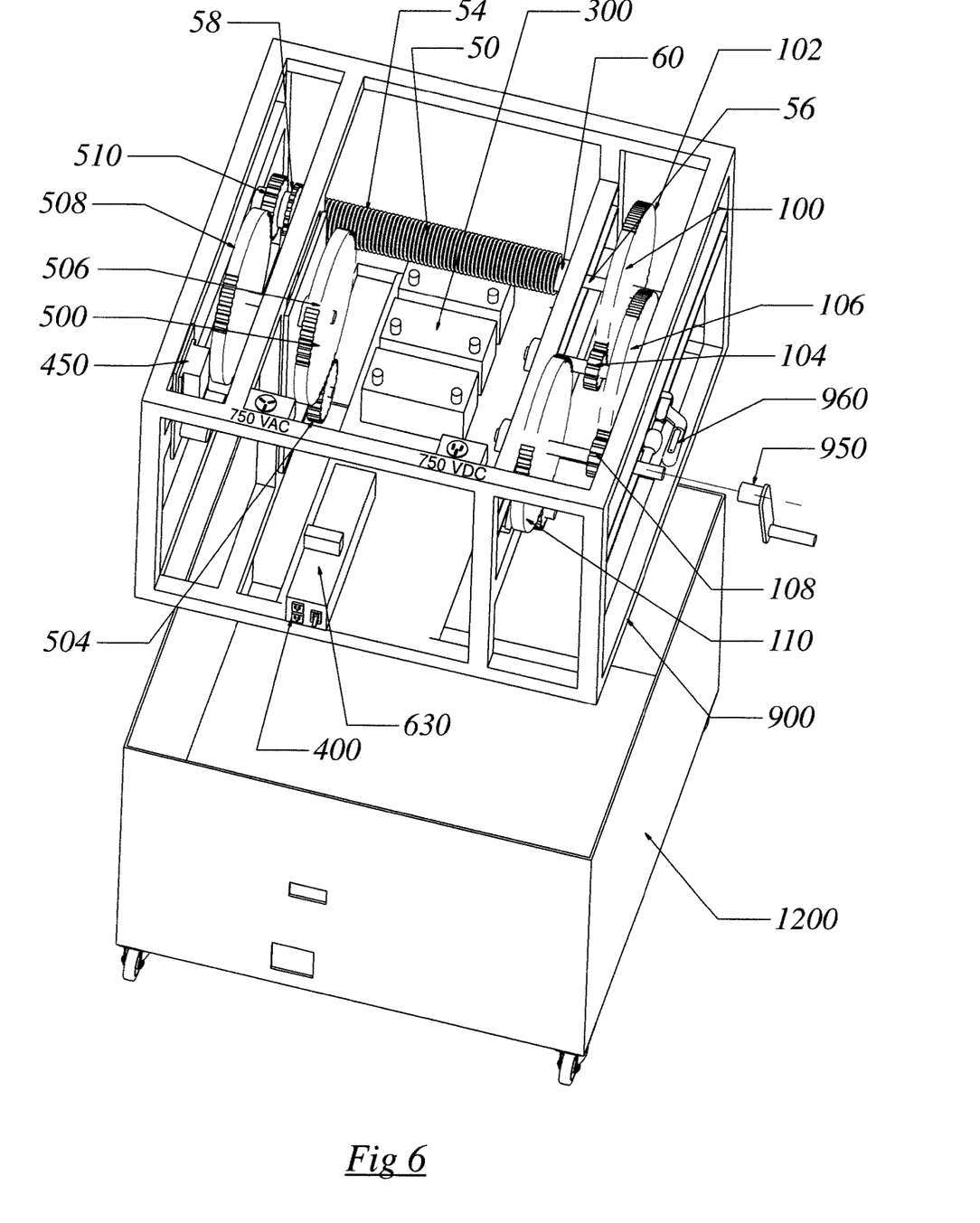
FIG. 6 is an exploded perspective of a second preferred embodiment of the current apparatus, where select elements of the invention are shown above the carrier.
Figure 7:
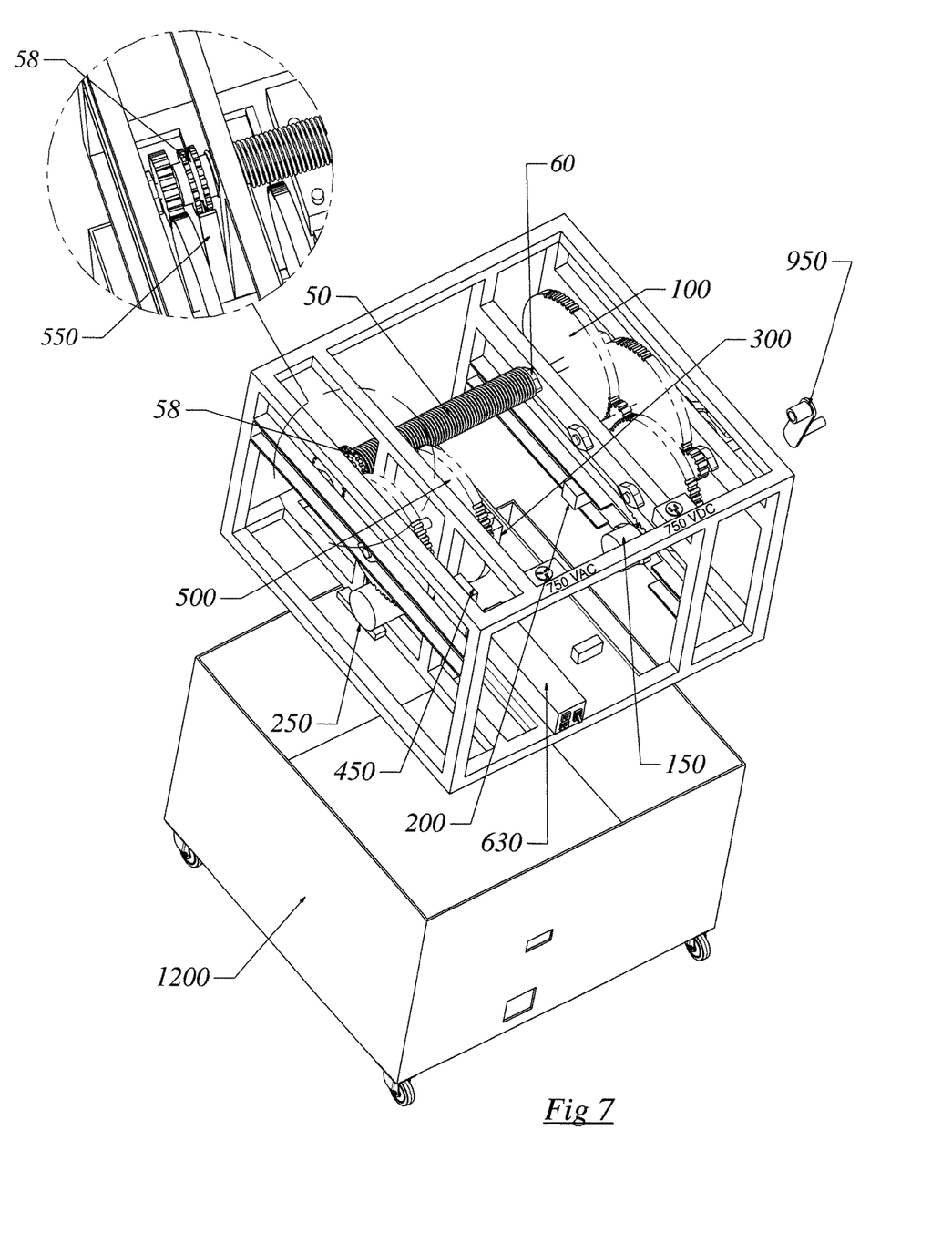
FIG. 7 is an exploded perspective of a second preferred embodiment of the current apparatus, where select elements of the invention are shown above the carrier.

FIGS. 6 and 7 are exploded perspectives of a first embodiment of the current apparatus, where select elements of the invention are attached to frame (900) above portable carrier (1200). In operation, frame (900) can be carried by portable carrier (1200). For ease of understanding, select mechanical structures of the invention are shown without the connections that transmit electricity. By way of illustration, among other things, those skilled in the art recognize that connections between the one or more batteries (300) and controller (630) are required for current invention's operation. Within the scope of the current invention, interconnections and communications between the elements of the current invention are enabled in FIGS. 1-3.

With reference to FIGS. 6 and 7, spring and shaft combination (50) is connected to first gear combination (100). Torsion spring (54) rides on shaft (56). As shown mechanical stop (550) engages second gear combination (500) and prevents spring (54) from unwinding until it is necessary to rotate shaft (56). Unwinding spring (54) causes shaft (56) to rotate first gear combination (100). Second gear combination (500) is attached to a first slidable collar (58) of spring (54) riding on shaft (56). When activated, second fixed collar (60) attached to shaft (56) rotates shaft (56) connected with first gear combination (100). When approximately 800 Joules of torque is applied to spring (54), spring (54) rotates shaft (56).

As shown, first gear combination (100) utilizes intermeshed gears (102-110) to rotate alternator's (150) rotor. However, other preferred embodiments of the invention can use more or less intermeshed gears to rotate the alternator's (150) rotor. Although not shown, other embodiments of the current invention can be provided with chain links or other means linking the gears instead of intermeshed gears allowing first gear combination (100) to rotate alternator's (150) rotor.

As shown, second gear combination (500) utilizes intermeshed gears (504-510) to wind spring (54) However, other preferred embodiments of the invention can use more or less intermeshed gears to wind spring (54). Although not shown, other embodiments of the current invention can be provided with chain links or other means linking the gears instead of intermeshed gears allowing second gear combination (500) to wind spring (54).

In any manner acceptable in the art, controller (630) is interconnected with alternator (150), one or more batteries (300), AC outlet (400) and AC motor (250).

AC motor (250) is connected to alternator (150) and second gear combination (500). Inlets (750 AC and 750 DC) are positioned on frame (900). Supplemental energy source (600) can be connected to inlets (750 AC or 750 DC) in any manner acceptable in the art. Select preferred embodiments of the current invention are provided with a circuit breaker that can prevent transmission of electricity through the invention's circuits. Select preferred embodiments can be provided with a lock that prevents the mechanical components of the invention from operating.

Figure 8:
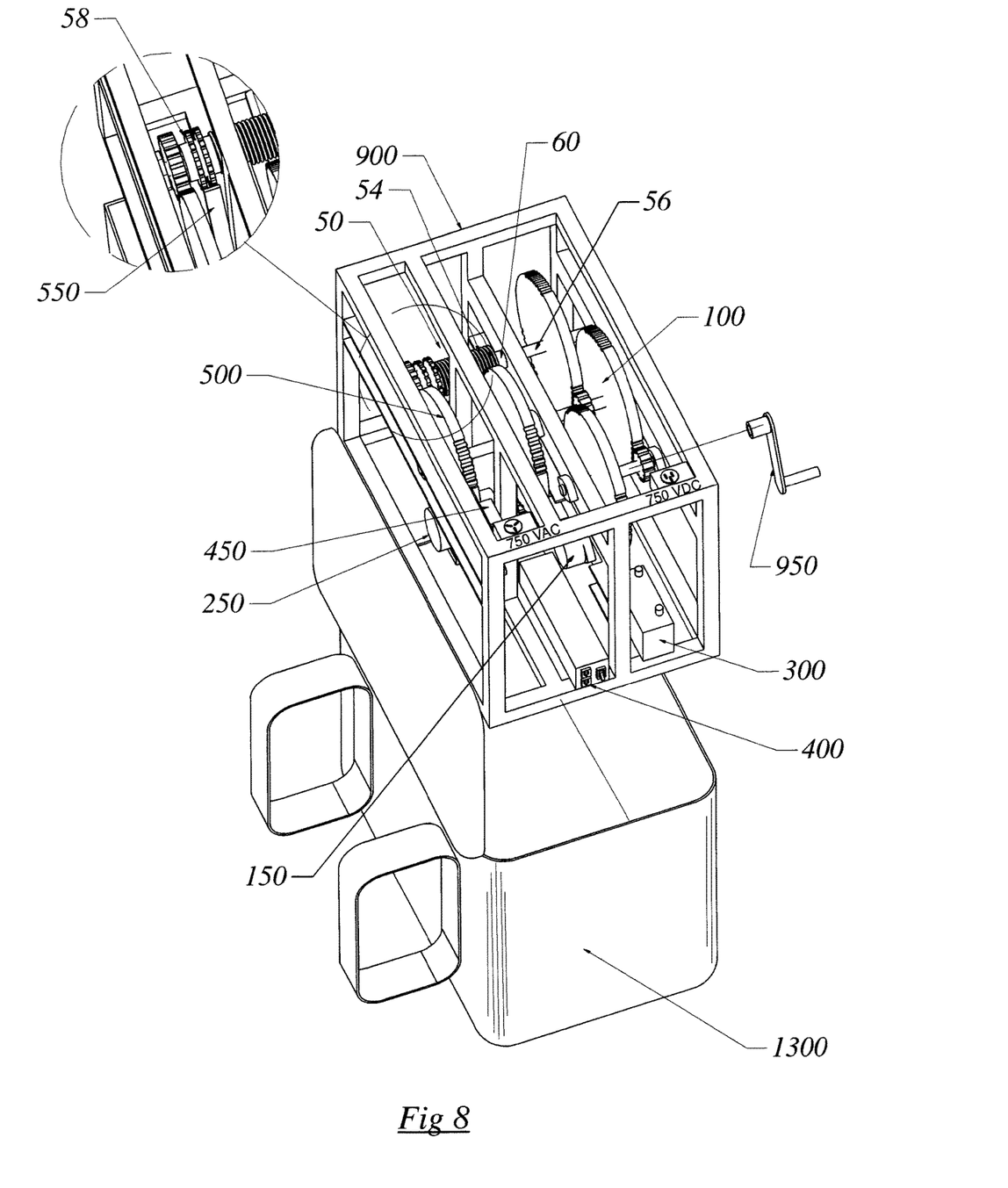
FIG. 8 is an exploded perspective of a third preferred embodiment of the current apparatus, where select elements of the invention are shown above the carrier.

With reference to FIG. 8, frame (900) is sized for fitting into a backpack or other similar carrier (1300). Spring and shaft combination (50) is connected to first gear combination (100). As shown mechanical stop (550) engages second gear combination (500) and prevents spring (54) from unwinding until it is necessary to rotate shaft. Unwinding spring (54) causes the shaft to rotate first gear combination (100). Second gear combination (500) is attached to a first slidable collar (58) of spring (54) riding on (56) shaft. When activated, second fixed collar (60) attached to shaft (56) rotates shaft (56) connected with first gear combination (100). When approximately 800 Joules of torque is applied to spring (54), spring (54) rotates shaft (56).

As shown, first gear combination rotates alternator's (150) rotor. Although not shown, other embodiments of the current invention can be provided with chain links or other means linking the gears instead of intermeshed gears allowing first gear combination (100) to rotate alternator's (150) rotor.

As shown, second gear combination (500) winds spring (54). However, other preferred embodiments of the invention can use more or less intermeshed gears to wind spring (54). Although not shown, other embodiments of the current invention can be provided with chain links or other means linking the gears instead of intermeshed gears allowing second gear combination (500) to wind spring (54).

In any manner acceptable in the art, control module (450) is interconnected with alternator (150), one or more batteries (300), AC outlet (400) and AC motor (250).

AC motor (250) is connected to alternator (150) and second gear combination (500).

Inlets (750 AC and 750 DC) are positioned on frame (900). Supplemental energy source (600) (not shown in this view) can be connected to inlets (750 AC or 750 DC) in any manner acceptable in the art. Select preferred embodiments of the current invention are provided with a circuit breaker that can prevent transmission of electricity through the invention's circuits. Select preferred embodiments can be provided with a lock that prevents the mechanical components of the invention from operating.

Select preferred embodiments of the current invention have been disclosed and enabled as required by Title 35 of the United States Code.

What is claimed is:

1. A mechanical energy storage apparatus, carried by a portable carrier, for supplying alternating current (AC); the apparatus comprising:
   a) a spring adapted for storing and delivering mechanical energy to a shaft connected to a first gear combination;
   b) a second gear combination mechanically connected to the spring for winding the spring;
   c) an alternator connected to the first gear combination for generating alternating current (AC) that subsequently flows to:
      i) a semiconductor rectifier converting AC to direct current (DC); or
      ii) an AC motor adapted to mechanically energize the second gear combination; and
      iii) a control module adapted to control the semiconductor rectifier and one or more batteries;
   d) the one or more batteries electrically connected with the semiconductor rectifier;
   e) an inverter electrically connected to the one or more batteries and adapted to supply AC current to:
      i) an AC outlet;
      ii) the AC motor; and
      iii) the control module;
   f) a stop mechanically contacting the second gear combination preventing the spring from unwinding until rotation of the shaft is initiated;
   g) the control module connected to the semiconductor rectifier for regulating DC supplied to the one or more batteries and for selectively controlling AC current flow to the AC motor and the AC outlet, wherein the control module further:
      i) activates the AC motor to mechanically energize the second gear combination that torques the spring; or
      ii) measures voltage stored in the one or more batteries and actuates the AC motor to mechanically energize the second gear combination; or
      iii) signals that supplemental energy is required to replenish the one or more batteries and allows a source of supplemental energy, distinct from the apparatus, to supply supplemental energy via an AC inlet of the apparatus, a DC inlet of the apparatus or a crank connected to the first or the second gear combination.

2. The apparatus of claim 1, wherein each battery provides from about 1100 ampere hours to about 1200 ampere hours of energy before supplemental energy is required to replenish the battery.

3. The apparatus of claim 2, wherein the first shaft rotates at speeds of from about 1 RPM to about 50 RPM and the alternator rotates at speeds of from about 50 RPM to about 1200 RPM.

4. The apparatus of claim 3, wherein 0.4 volts drawn from the one or more batteries and converted to AC energizes the AC motor and second gear combination to wind the spring.

5. The apparatus of claim 1, wherein the supplemental energy is supplied to the one or more batteries or the AC motor.

6. A mechanical energy storage apparatus for supplying alternating current (AC); the apparatus comprising:
   a) a spring adapted for storing and delivering mechanical energy to a shaft connected to a first gear combination;
   b) a second gear combination mechanically connected to the spring for winding the spring;
   c) an alternator connected to the first gear combination for generating alternating current (AC) that subsequently flows to:
      i) a rectifier converting AC to direct current (DC); or
      ii) an AC motor adapted to mechanically energize the second gear combination; and
      iii) a control module electrically connected with the rectifier and adapted to control the rectifier and a battery;
   d) an inverter electrically connected to the battery and adapted to supply AC current to:
      i) an AC outlet;
      ii) the AC motor; and
      iii) the control module;
   f) a stop mechanically contacting the second gear combination preventing the spring from unwinding until rotation of the shaft is initiated;
   g) the control module connected to the rectifier for regulating DC supplied to the battery and for selectively controlling AC current flow to the AC motor and the AC outlet, wherein the control module further:
      i) activates the AC motor to mechanically energize the second gear combination that torques the spring; or
      ii) measures voltage stored in the battery and actuates the AC motor to mechanically energize the second gear combination; or
      iii) signals that supplemental energy is required to replenish the battery and allows a source of supplemental energy, distinct from the apparatus, to supply supplemental energy via an AC inlet of apparatus, a DC inlet of the apparatus or a crank connected to the first or the second gear combination.

7. The apparatus of claim 6, wherein the supplemental energy is supplied to the battery or the AC motor.

8. The apparatus of claim 7, wherein each battery provides from about 1100 ampere hours to about 1200 ampere hours of energy before supplemental energy is required to replenish the battery.

9. The apparatus of claim 8, wherein the first shaft rotates at speeds of from about 1 RPM to about 50 RPM and the alternator rotates at speeds of from about 50 RPM to about 1200 RPM.

10. The apparatus of claim 9, wherein 0.4 volts drawn from the battery and converted to AC energizes the AC motor and second gear combination to wind the spring.

11. A mechanical energy storage apparatus for supplying alternating current (AC); the apparatus comprising:
   a) a spring adapted for storing and delivering mechanical energy to a shaft connected to a first gear combination;
   b) a second gear combination mechanically connected to the spring for winding the spring;
   c) an alternator connected to the first gear combination for generating alternating current (AC) that subsequently flows to:
      i) a rectifier converting AC to direct current (DC); or
      ii) an AC motor adapted to mechanically energize the second gear combination; and
      iii) a control module electrically connected with the rectifier and adapted to control the rectifier and a battery;
   d) an inverter electrically connected to the battery and adapted to supply AC current to:
      i) an AC outlet;
      ii) the AC motor; and
      iii) the control module;
   f) a stop mechanically contacting the second gear combination preventing the spring from unwinding until rotation of the shaft is initiated;
   g) the control module connected to the rectifier for regulating DC supplied to the battery and for selectively controlling AC current flow to the AC motor and the AC outlet, wherein the control module further:
      i) activates the AC motor to mechanically energize the second gear combination that torques the spring; or
      ii) measures voltage stored in the battery and actuates the AC motor to mechanically energize the second gear combination; or
      iii) signals that supplemental energy is required to replenish the battery; and
   h) a crank, distinct from the apparatus, connected to the first or the second gear combination for supplying the supplemental energy.

12. The apparatus of claim 11, wherein the supplemental energy is supplied to the battery or the AC motor.

13. The apparatus of claim 12, wherein the battery provides from about 1100 ampere hours to about 1200 ampere hours of energy before supplemental energy is required to replenish the battery.

14. The apparatus of claim 13, wherein the first shaft rotates at speeds of from about 1 RPM to about 50 RPM and the alternator rotates at speeds of from about 50 RPM to about 1200 RPM.

15. The apparatus of claim 14, wherein 0.4 volts drawn from the one the battery and converted to AC energizes the AC motor and second gear combination to wind the spring.

* * * * *